Nov. 6, 1951 H. SAMMONS ET AL 2,573,989
INTERNAL-COMBUSTION ENGINE OPERATED ON THE TWO-STROKE CYCLE
Filed Oct. 12, 1949 3 Sheets-Sheet 3

Inventors
Herbert Sammons and Leslie F. Hall
By: Emery Holcombe & Blair
Attorneys Patented Nov. 6, 1951

2,573,989

UNITED STATES PATENT OFFICE 2,573,989

INTERNAL-COMBUSTION ENGINE OPERATED ON THE TWO-STROKE CYCLE

Herbert Sammons, Gerrards Cross, and Leslie Frank Hall, London, England, assignors to D. Napier & Son Limited, London, England, a British company Application October 12, 1949, Serial No. 120,844
In Great Britain November 9, 1948

7 Claims. (Cl. 123—65)

This invention relates to internal combustion engines operating on the two-stroke cycle and of the kind in which the inlet and exhaust ports are controlled by the piston and each of at least the majority of the inlet ports has an exhaust port situated circumferentially adjacent to it.

That is to say the invention is not concerned with engines of the two-stroke type in which an inlet port or ports are disposed in one circumferential part of the cylinder and the exhaust ports are situated in a substantially opposite circumferential part of the cylinder but to engines in which the exhaust gases leave the cylinder through ports lying circumferentially adjacent to the inlet ports.

For convenience the upper end of a cylinder will be assumed to be the end adjacent to the cylinder head whether the cylinder is in fact of the more usual vertical upwardly extending or inclined type or of the horizontal or downwardly directed type, and the terms "upper," "upwards," "lower," "downwards," and the like are to be interpreted accordingly.

The object of the invention is to provide improved scavenging in two-stroke engines of the kind referred to.

In an internal combustion engine operating on the two-stroke cycle according to the present invention and having an exhaust port disposed circumferentialy adjacent to each of at least the majority of the inlet ports a guide surface is provided in each inlet port formed so as to tend to direct the gaseous charge entering through the inlet port towards the piston face and hence partially or wholly to counteract the tendency for the gas entering through the port to be directed obliquely towards the cylinder head, particularly when the port is just opening and still largely covered by the piston.

The guide surface is preferably constituted by or includes a lip formed on the edge of the port which is first uncovered by the piston and serving to deflect the incoming charge downwards across the port towards the face of the piston. The lip may be constituted by the end of a curved or inclined guide surface or may be constituted by a shallow rib or ledge projecting abruptly from the edge of the port.

Thus the lip tends to cause an abrupt downward deflection of the upper layers of the charge flowing through the port corresponding to the abrupt upward deflection of the lower layers of the charge which tends to be caused by the upper edge of the piston during the periods when the piston partially covers the inlet port; and the mean effect of the lip on the upper layers of the charge flowing through the port over the whole of the open period of the port tends to correspond approximately to the mean effect of the upper edge of the piston on the lower layers of the charge during the same period.

Conveniently the lip is formed on the upper edge of the inlet port but it may be constituted by a separate element inserted into and secured within the port. Moreover, in addition to the lip referred to, the port may contain one or more curved guide surfaces tending to increase the downward deflection of the charge towards the piston face when the port is uncovered.

It has been found that with such an arrangement the tendency which otherwise exists for a dead space or pocket to be formed during the scavenging period in the part of the cylinder immediately over the piston face and in front of the inlet ports and in which the burnt gases tend to remain comparatively undisturbed, is reduced or eliminated. Thus, with the invention the incoming charge is caused to flow substantially directly across the piston face and thus tends to sweep upwards the burnt gases above the whole area of the piston face.

The invention is particularly applicable to engines in which a ring of inlet ports and a ring of exhaust ports each extends substantially around the cylinder and one such construction according to the invention is illustrated in the accompanying drawings, in which Figure 1 is a section through the cylinder assembly of an engine according to the invention in a plane containing the axis of the cylinder, Figure 2 is an enlarged section of the centre portion of the cylinder liner structure employed in the cylinder assembly shown in Figure 1.

Since the invention is concerned with the cylinder assembly it is not thought necessary to illustrate other features of the engine which may follow known practice and in themselves form no part of the invention.

In the construction illustrated the cylinder assembly comprises a water cooled cylinder jacket member or block member A secured to a crank case B and containing a series of radially disposed exhaust passages $A^1$ and an inlet manifold or belt $A^2$ from which leads a series of radially disposed inlet passages $A^3$.

Mounted within the cylinder jacket member A is a liner C constituting the cylinder proper and formed and arranged so as to provide between the upper and lower end portions of the liner and the cylinder jacket member cooling water chambers D, D¹. The upper end of the liner is closed by a water cooled cylinder head E of known general type in which is formed a conical combustion chamber E¹ into which fuel can be injected through a fuel sprayer F in known manner, the cylinder head being secured to the cooling jacket member A by bolts or studs G.

The liner C is provided as shown with an external circumferential thickening or belt C¹ extending over its central portion, this thickened part being closely surrounded by and connected by brazing or the like to a sleeve C² which thus in effect forms part of the liner, and makes a close fluid-tight fit with the adjacent part of the jacket member A in which are formed the inlet and exhaust passages A³ and A¹. Formed through the thickened part C¹ of the liner and the sleeve C² is a ring of inlet ports C³ communicating with the inlet passages A³ and a ring of exhaust ports C⁴ communicating with the exhaust passages A¹.

Figure 1:
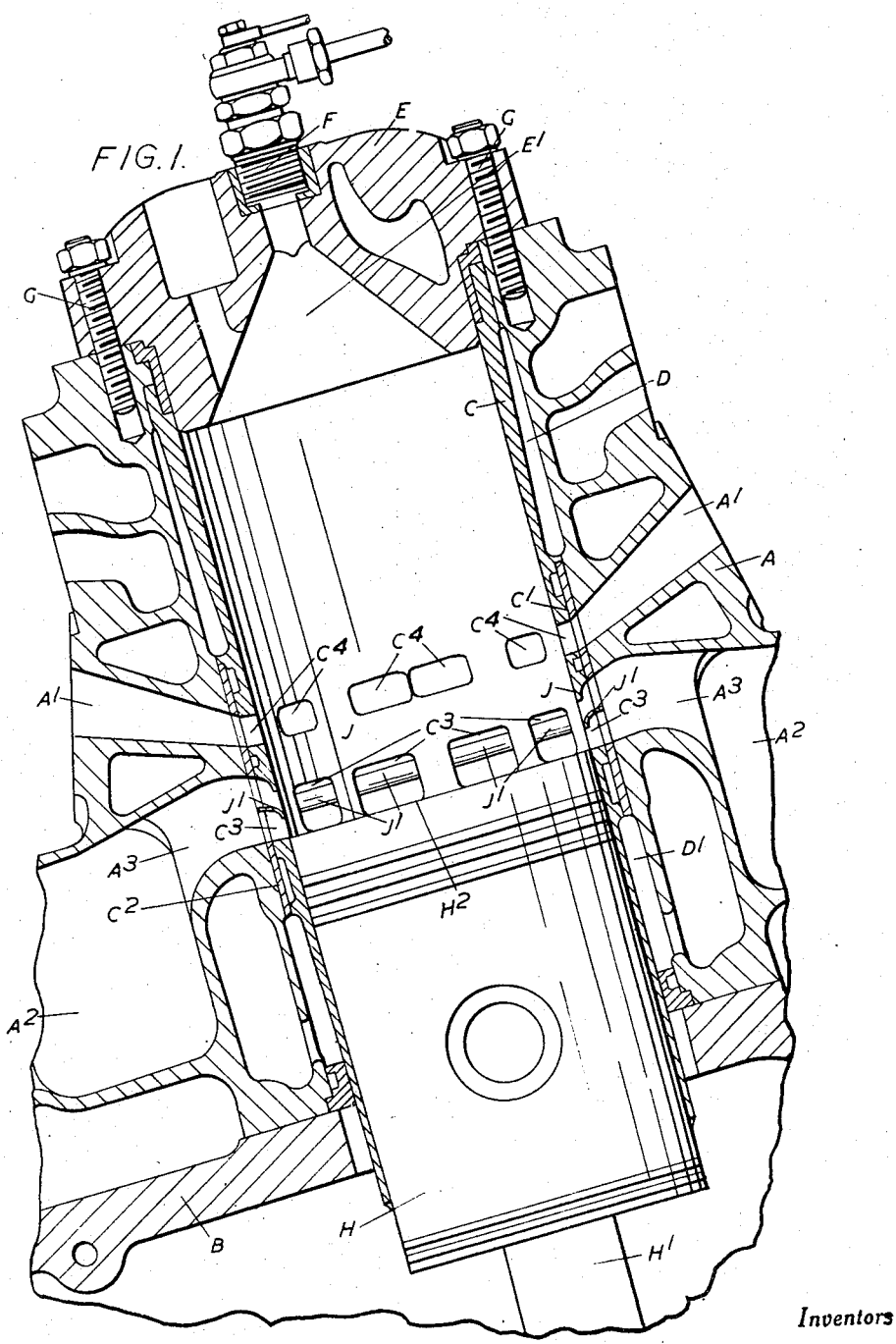
Figure 2:
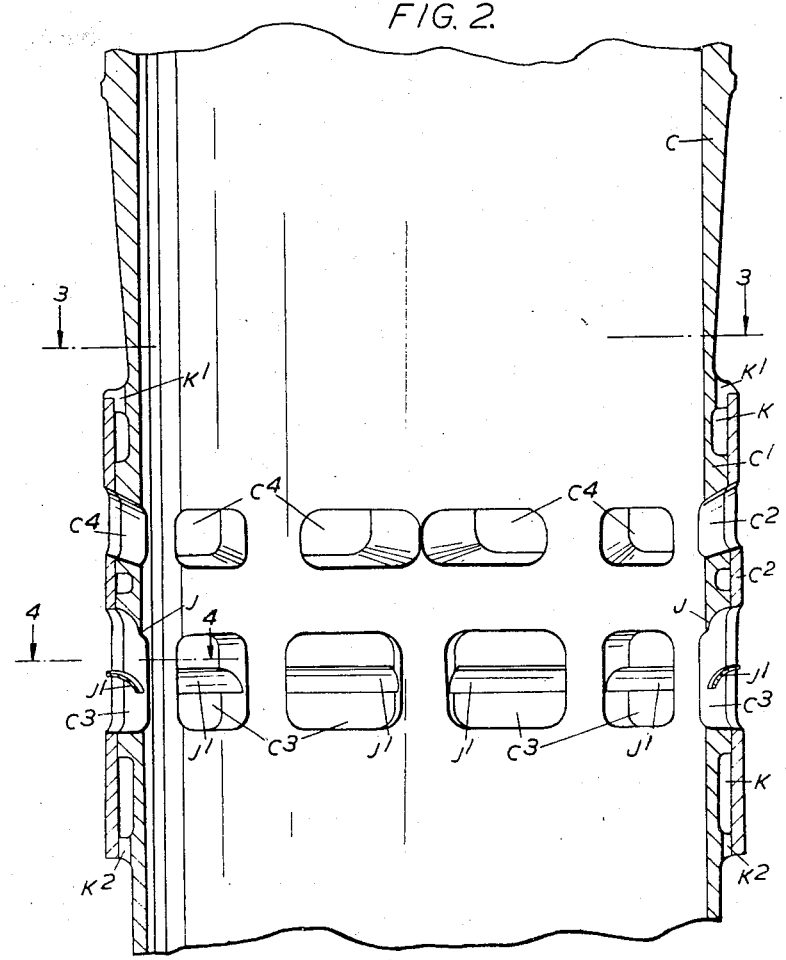
Figure 3:
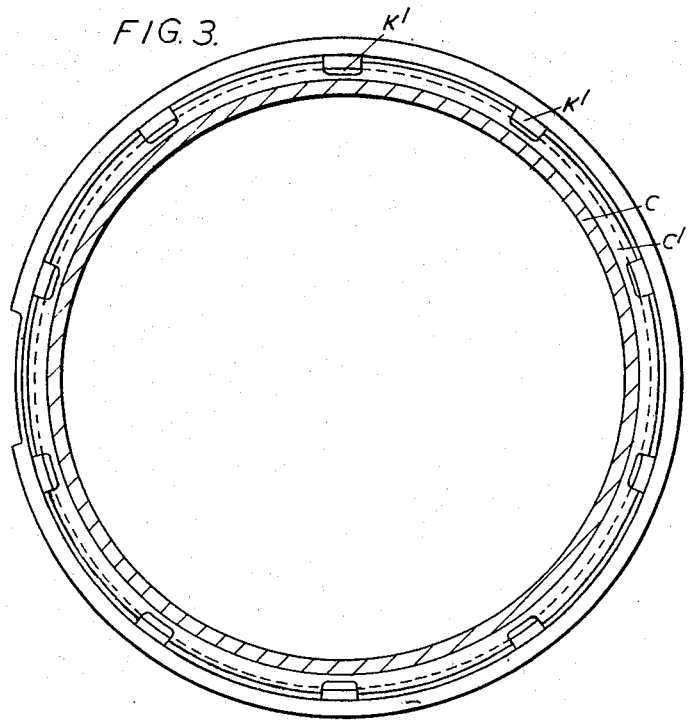
Figure 3 is a section on the line 3—3 of Figure 2.

The piston H which is connected to the crankshaft of the engine in the usual manner by a connecting rod H¹ and reciprocates within the liner A has a stroke such that at its outer dead-centre position, in which it is shown in Figure 1, its face H², which is flat, lies approximately level with the lower edge of the ring of inlet ports C³.

The exhaust ports C⁴ are of simple normal formation.

Figure 4:
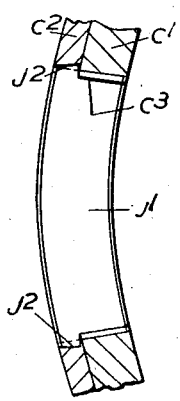
Figure 4 is a fragmentary section on the line 4—4 of Figure 2.

The upper edge of each inlet port C³, however, is formed as shown with a downwardly projecting lip J while at an intermediate point in the vertical length of each inlet port a curved guide plate or deflector J¹ is provided. Each curved deflector J¹ is formed from heat resisting sheet metal and is formed and secured in position in the manner indicated in Figure 4. That is to say parallel grooves are formed, at an appropriate height in the sides of the part of each exhaust port lying in the sleeve C² and end portions J² of the sheet metal deflector are slid into these slots and secured in position by brazing so that the remaining portion of the deflector which is appropriately curved as shown lies freely in the part of the inlet port which is formed in the sleeve C itself.

In the arrangement shown it will be seen that the air entering the cylinder through each inlet port will tend to be deflected by the deflecting surfaces J and J¹ downwards towards the face of the piston thus counteracting the tendency which would otherwise predominate for the air to flow obliquely upwards towards the piston head. In this way the gases immediately over the piston crown tends to be swept out of the cylinder during the scavenging period.

Although the invention has been described with particular reference to an engine having rings of inlet and exhaust ports each extending substantially around the whole circumference of the cylinder it will be understood that the invention is applicable to an engine in which the inlet and exhaust ports lie adjacent to one another in one circumferential part of the cylinder, in which case the deflecting surface or surfaces will tend to cause the air flowing through the inlet ports to sweep across the piston face and then to be deflected up the far side of the cylinder towards the cylinder head and then across the cylinder again and down the side of the cylinder adjacent to the exhaust ports and out through the exhaust ports thus providing good scavenging.

In the arrangement shown circumferential grooves K, K are provided in the thickened portion C¹ of the sleeve C so as to form with the sleeve circumferential chambers as indicated at K and these chambers conveniently communicate with the water chambers D and D¹ through a series of slots formed in the upper and lower ends of the thickened portion C¹ as indicated at K¹ for the upper end of the thickened portion and at K² for the lower end of the thickened portion.

In some cases where the vertical length of the inlet ports is comparatively great each port might be provided with two or more spaced curved deflectors.

What we claim as our invention and desire to secure by Letters Patent is:

1. An internal combustion engine operating on the two-stroke cycle including a cylinder having formed therein piston-controlled inlet and exhaust ports with an exhaust port disposed circumferentially adjacent to each of at least the majority of the inlet ports, a piston arranged to reciprocate within the cylinder so as to uncover the inlet and exhaust ports at the end of its outstroke, and a lip projecting abruptly downwards from the edge of each inlet port which is first uncovered by the piston and deflecting the upper layers of the gaseous charge entering through the port downwards in a manner corresponding approximately to the upward deflection of the lower layers of the charge caused by the upper edge of the piston during the period when the piston partially covers the port.

2. An internal combustion engine operating on the two-stroke cycle as claimed in claim 1, in which a ring of inlet ports and a ring of exhaust ports each extends around the cylinder.

3. An internal combustion engine operating on the two-stroke cycle and having piston-controlled inlet and exhaust ports with an exhaust port disposed circumferentially adjacent to each of at least the majority of the inlet ports, a piston arranged to reciprocate within the cylinder and uncover the ports at the end of its outstroke, a lip formed on the edge of each inlet port which is first uncovered by the piston and deflecting the incoming charge downwards across the port towards the face of the piston, and a deflector lying in each inlet port between the edges which are respectively uncovered first and last by the piston, the deflector being bent to assist in directing the incoming charge towards the piston face.

4. An internal combustion engine operating on the two-stroke cycle as claimed in claim 3, in which a ring of inlet ports and a ring of exhaust ports each extends around the cylinder.

5. An internal combustion engine operating on the two-stroke cycle as claimed in claim 4, in which the cylinder comprises a liner surrounded by a cooling jacket member, the inlet ports being formed in an external circumferential thickening in the liner which in turn is surrounded by a sleeve rigidly united to the liner and supporting from their outer ends the curved deflectors which lie in the inlet ports.

6. An internal combustion engine operating on the two-stroke cycle as claimed in claim 5, in which the sleeve and the liner and the sleeve and the deflectors are united by brazing.

7. An internal combustion engine operating on the two-stroke cycle including a cylinder having formed therein piston controlled inlet and exhaust ports disposed circumferentially with an adjacent port axially alined with and adjacent to each of at least the majority of the inlet ports, a piston arranged to reciprocate within the cylinder so as to uncover the exhaust and inlet ports sequentially at the end of its outstroke and a plurality of guide surfaces terminating in lips projecting abruptly downward at each inlet port formed to direct the gaseous charge entering through the inlet port towards the piston face and thus counteract the tendency for gas entering through the port to be directed obliquely towards the cylinder head.

HERBERT SAMMONS.
LESLIE FRANK HALL.

REFERENCES CITED

The following references are of record in the file of this patent:

UNITED STATES PATENTS

| Number | Name | Date |
|---|---|---|
| 1,086,793 | Steinbecker | Feb. 10, 1914 |
| 1,825,545 | Riehm | Sept. 29, 1931 |
| 2,123,065 | Sass | July 5, 1938 |

FOREIGN PATENTS

| Number | Country | Date |
|---|---|---|
| 155,034 | Great Britain | of 1920 |
| 512,598 | Great Britain | of 1939 |
| 519,427 | Germany | of 1931 |